(12) United States Patent
Chen et al.

(10) Patent No.: US 12,553,777 B2
(45) Date of Patent: Feb. 17, 2026

(54) TEMPERATURE SENSING DEVICE

(71) Applicant: ORIENTAL SYSTEM TECHNOLOGY INC., Hsin-Chu (TW)

(72) Inventors: Chun-Chiang Chen, Zhubei (TW); Chein-Hsun Wang, Hsin-Chu (TW); Po-Tzu Chen, Taipei (TW); Jenping Ku, Hsinchu County (TW); Ming-Tsung Yang, Hsinchu County (TW)

(73) Assignee: ORIENTAL SYSTEM TECHNOLOGY INC., Hsin-Chu (TW)

( * ) Notice: Subject to any disclaimer, the term of this patent is extended or adjusted under 35 U.S.C. 154(b) by 351 days.

(21) Appl. No.: 18/525,445

(22) Filed: Nov. 30, 2023

(65) Prior Publication Data

US 2025/0180407 A1 Jun. 5, 2025

(51) Int. Cl.
*G01J 5/12* (2006.01)
*G01J 5/0875* (2022.01)

(52) U.S. Cl.
CPC .............. *G01J 5/12* (2013.01); *G01J 5/0875* (2013.01)

(58) Field of Classification Search
CPC ................................. G01J 5/12; G01J 5/0875
See application file for complete search history.

(56) References Cited

FOREIGN PATENT DOCUMENTS

| JP | 2003194630 A | * | 7/2003 | ................ G01J 5/10 |
| JP | 5793679 B2 | * | 10/2015 | ................ G01J 5/08 |

* cited by examiner

*Primary Examiner* — Casey Bryant
(74) *Attorney, Agent, or Firm* — HDLS IPR SERVICES; Chun-Ming Shih

(57) ABSTRACT

The disclosure provides a temperature sensing device including a thermopile sensing assembly with a metal sleeve and a metal grid for blocking microwave from entering the thermopile sensor and influencing temperature detection. The temperature sensing device includes one or more than one thermopile sensing elements, an ambient temperature sensor, a signal processing chip, and an infrared lens providing narrow FOV. When dual thermopile sensing elements are used, one is active unit with narrow FOV for measuring the infrared radiation of the object to be detected, and the other one is a dummy unit for the compensation of the thermal shock to achieve the purpose of accurate temperature detection. The disclosure also provides the visible light source to indicate the sensing area of the thermopile sensor, that may facilitate the user positioning the object to be heated. FOV of the light source is the same with that of the thermopile sensor.

11 Claims, 4 Drawing Sheets

TEMPERATURE SENSING DEVICE

BACKGROUND OF THE DISCLOSURE

Technical Field

The present disclosure relates to a temperature sensing device, particularly relates to a non-contact temperature sensing device, thermopile sensor with narrow field of view (FOV) and microwave disturbance resistance properties.

Description of Related Art

The smart appliance, such as smart microwave oven, needs a non-contact temperature sensor for monitoring the surface temperature of heating object, such as food, in order to control the microwave power and the duty cycles plus duration time of the microwave heating.

For smart microwave oven application, we are looking for simple and one button setting of targeted temperature and just start the heating operation without setting the power level and heating duration, which causes overheating or under heating frequently.

Traditional a single point type thermopile sensor is used for non-contact temperature sensing with high FOV (for example 70-110 degrees) which is not suitable for microwave oven operation. In the application of heating food using microwave oven, the distance between the thermopile sensor and the food on the tray is about 25 cm, which leads to in-accurate temperature sensing of the heated object due to the measured temperature includes heating object as well as surrounding ambient environment based on wide FOV thermopile sensor. Therefore, it is required to use narrow FOV thermopile sensor (for example, 5-15 degrees) to sense the temperature of heated object only without measuring the ambient background plus the food objects.

Traditional noncontact temperature sensing of heated object is performed after the microwave power is intermittent OFF period, which is not convenient for microwave power control. For non-stopping detection of temperature of heated object, there is leaked microwave radiation sensed by the thermopile sensor, which causes disturbance in the temperature readout. Hence a narrow FOV and microwave resistant thermopile sensor is necessary for smart microwave appliance.

For a small FOV thermopile sensor, the sensed area is about 4 cm in diameter which is very hard to place the heating object under its field of view for temperature sensing. Therefore a visible light source to highlight the area to be sensed may facilitate the user positioning the heating object easily.

Another issue in the related-art of the thermopile sensor is the "thermal shock" effect due to fast increasing of air temperature within the microwave oven by heated water vapor. The thermal shock effect is caused by the package casing effect of thermopile sensor. The input of the thermopile sensor is generally divided into two parts. One part is the external radiation inputted from the object to be detected through window, and the other part is the thermal radiation inputted from the package casing of the thermopile sensor. When the cover's temperature and the cold-end of the thermopile sensor are unbalanced, the thermal shock effect may be occurred which is caused by the air temperature disturbance in the microwave oven.

The thermal shock effect may impact the accuracy of measured temperature of heated object. In view of this, the inventors have devoted themselves to the aforementioned related art, researched intensively try to design a temperature sensing device providing narrow FOV, microwave disturbance resistant, and accurate temperature detection. Moreover, for the other practical function, the visible light source with the same FOV may be adopted to facilitate positioning the object to be heated.

SUMMARY OF THE DISCLOSURE

One objective of the disclosure is to provide a temperature sensing device for smart microwave oven application. Comparing to the related art, the package of the thermopile sensing assembly of the disclosure is using the design of metal sleeve and metal grid to block the microwave from entering thermopile sensor, and further improve the accuracy of the thermopile sensor.

In some embodiments, in order to prevent the measurement deviation caused by the thermal shock effect from the package casing due to the prompt increasing of inner temperature when the microwave oven is heating, the thermopile sensor of the disclosure is using the design of dual thermopile sensing elements. One of the thermopile sensing element (for example, active thermopile sensing element) is used to measure the infrared radiation of the object to be detected. The other one of the thermopile sensing element (for example, dummy thermopile sensing element) is used to measure the thermal radiation of the package casing for the compensation of the thermal shock effect to provide accurate temperature detection.

Furthermore, regarding the requirement of narrow FOV used in the temperature detection of the microwave oven, an infrared lens adopted in the disclosure may provide narrow FOV, such as 5-15 degrees. Outside of the metal package casing, a metal sleeve may be used to block the thermal radiation outside FOV, and the metal grid is disposed on the window portion of the metal sleeve to block the microwave from entering to achieve the purpose of accurate temperature detection under the condition of microwave heating.

In some embodiments, the infrared lens is a spherical lens or a silicon Fresnel lens to provide narrow FOV for the thermopile sensor.

In some embodiments, the FOV of the infrared lens is greater than or equal to 5 degrees and less than or equal to 15 degrees.

In some embodiments, the infrared lens may have an anti-reflective coating layer to increase a transmittance of the infrared radiation.

In some embodiments, the signal processing chip includes a low-noise amplifier, a multiplexer, an analog-to-digital converter (ADC), a non-volatile memory, and a communication interface.

In some embodiments, the analog-to-digital converter is a sigma-delta ADC.

In order to facilitate the user examining and positioning the heating object on the tray within microwave oven, the disclosure further has visualization design. A visible light source with the same narrow FOV is disposed adjacent to the thermopile sensor. The visible light source may be a light emitting diode or a laser light source with a beam expander.

In summary, in order to solve the problem of the disturbance to the thermopile sensor from microwave radiation during microwave oven heating, the disclosure includes a metal sleeve having a metal grid and disposed outside the package casing of the thermopile sensor. Further, in order to solve the problem of thermal shock caused by the air temperature disturbance in the microwave oven, the disclosure provide the temperature sensing device having dual thermopile sensing elements. The active thermopile sensing element is used to sense the temperature data of the object to be heated (for example, food) in the microwave oven. The dummy thermopile sensing element is used to sense thermal radiation from the package casing itself within the metal package which is caused by the air temperature disturbance in the microwave oven, for example, the prompt increasing of the air temperature inside the microwave oven, named thermal shock effect. The signal processing chip is used to compensate the thermal shock effect through the dual thermopile temperature data to obtain the accurate temperature of the heated object.

Therefore, comparing to the related art, the disclosure compensates the thermal shock effect caused by the air temperature disturbance in the microwave oven to provide accurate temperature measurement. Moreover, the disclosure adopts the optical design of narrow FOV for precisely measuring the surface temperature of the object without including the background ambient temperature. Furthermore, the visualization design in the disclosure may help user placing heating object within the sensing area of thermopile sensor.

The technical contents of this disclosure will become apparent with the detailed description of embodiments accompanied with the illustration of related drawings as follows. It is intended that the embodiments and drawings disclosed herein are to be considered illustrative rather than restrictive.

DETAILED DESCRIPTION

The following specific embodiments are provided to illustrate the present disclosure. Those skilled in the art can easily understand other advantages and effects of the present disclosure based on the disclosed contents in this specification.

The technical contents of this disclosure will become apparent with the detailed description of embodiments accompanied with the illustration of related drawings as follows.

Figure 1:
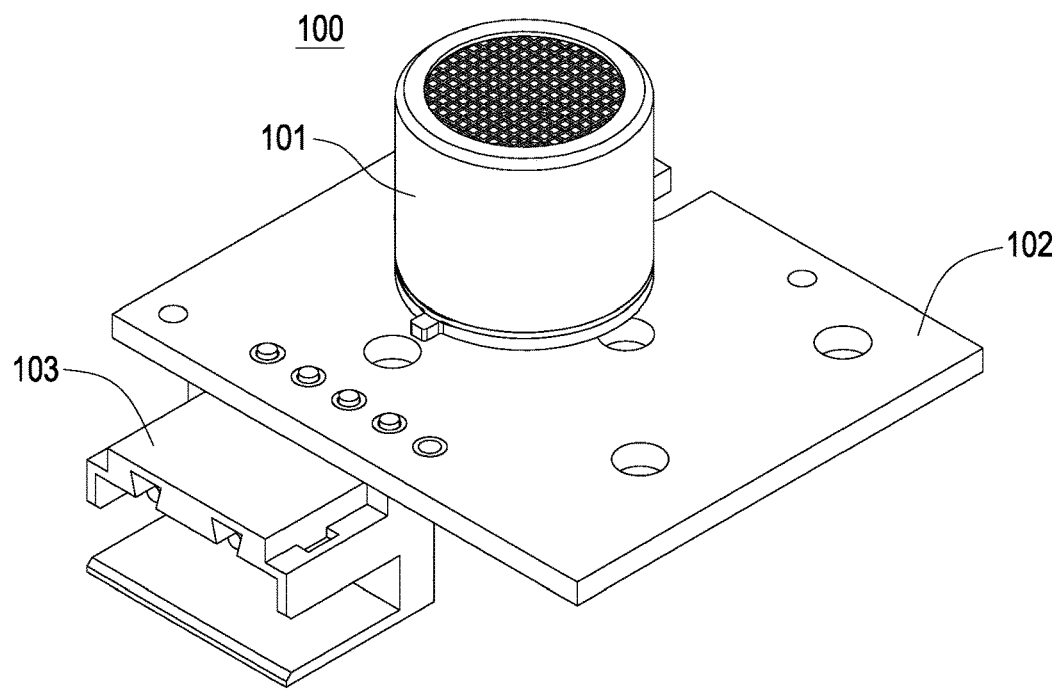
FIG. 1 is an exploded view of the temperature sensing device of the disclosure.

FIG. 1 is an exploded view of the temperature sensing device of the disclosure. The temperature sensing device 100 includes a thermopile sensing assembly 101 having a metal sleeve, a substrate 102, and a signal connector terminal 103. The metal sleeve of the thermopile sensing assembly 101 has a metal grid disposed thereon for blocking the microwave radiation from entering the metal sleeve. The metal sleeve is connected to the ground line of the microwave oven through the signal connector terminal 103.

Figure 2:
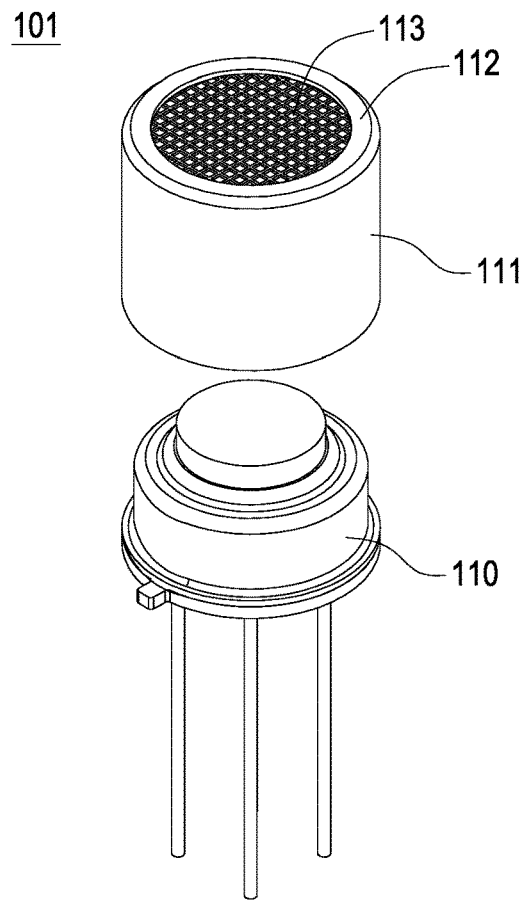
FIG. 2 is an exploded diagram of the thermopile sensing assembly of the disclosure.

FIG. 2 is an exploded diagram of the thermopile sensing assembly 101 of the disclosure. The thermopile sensing assembly 101 is structured by the thermopile sensor 110 and the metal sleeve 111. The metal sleeve 111 has a window 112, the metal grid 113 is disposed on the window 112 to block the microwave radiation from entering, but let the infrared radiation of the object to be detected to go through. The metal grid 113 may also be disposed on the inner side of the window 112.

Figure 3:
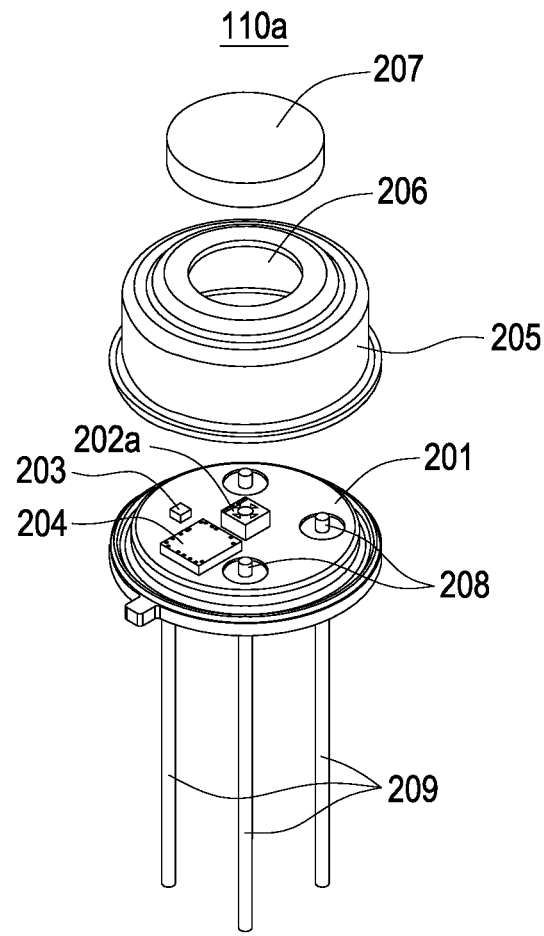
FIG. 3 is an exploded diagram of the thermopile sensor in the first embodiment of the disclosure.

FIG. 3 is an exploded diagram of the thermopile sensor 110a in the first embodiment of the disclosure. In the first embodiment, the thermopile sensor 110a adopts the metal package casing 205. The thermopile sensor 110a has a metal base 201. The metal base 201 is used to fix the assembly, and has a plurality of bonding wire pillar 208 and a plurality of signal pin 209 for signal wiring. The metal base 201 has a thermopile sensing element 202a, an ambient temperature sensor 203, and a signal processing chip 204 fixed thereon. The ambient temperature sensor 203 may be structured by the thermistor. The metal base 201 has the metal package casing 205 disposed thereon. The metal package casing 205 has a window 206 defined thereon. An infrared lens 207 may be fixed on the window 206. The infrared lens 207 may be a spherical lens or a silicon Fresnel lens. The infrared lens 207 may external-type (outside the metal package casing 205) or internal-type (inside the metal package casing 205).

Figure 4:
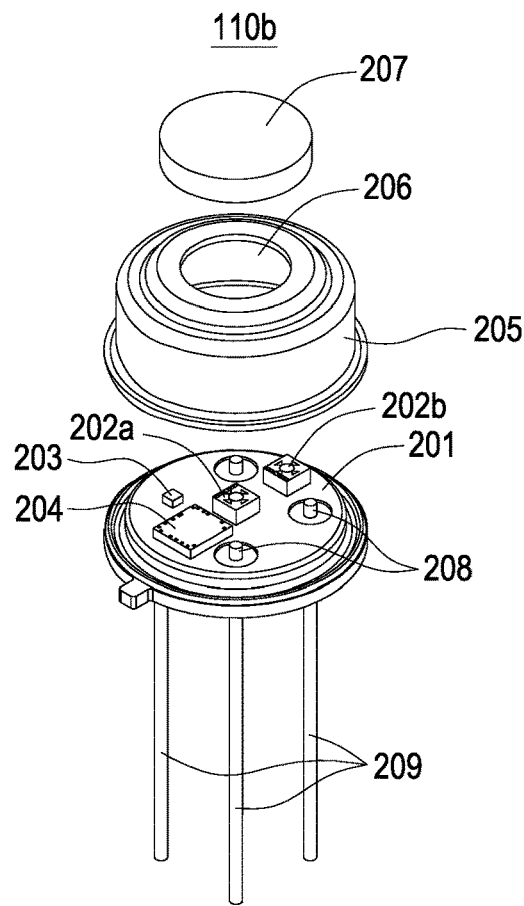
FIG. 4 is an exploded diagram of the thermopile sensor in the second embodiment of the disclosure.

FIG. 4 is an exploded diagram of the thermopile sensor 110b in the second embodiment of the disclosure. The thermopile sensor 110b similarly adopts the metal package casing 205. The thermopile sensor 110b has a metal base 201. The metal base 201 is used to fix the assembly, and has a plurality of bonding wire pillar 208 and a plurality of signal pin 209 for signal wiring. The metal base 201 has two thermopile sensing element 202a, 202b, the ambient temperature sensor 203, and the signal processing chip 204 fixed thereon. The ambient temperature sensor 203 may be structured by the thermistor. The metal base 201 has the metal package casing 205 disposed thereon. The metal package casing 205 has a window 206 defined thereon. An infrared lens 207 may be fixed on the window 206. The infrared lens 207 may be a spherical lens or a silicon Fresnel lens. The infrared lens 207 may external-type (outside the metal package casing 205) or internal-type (inside the metal package casing 205). Furthermore, the thermopile sensing element 202a is the active thermopile sensing element and is used to measure the infrared radiation of the outside object to be detected. The thermopile sensing element 202b is the dummy thermopile sensing element and is used to measure the thermal radiation of the metal package casing 205 for the compensation of the thermal shock to solve the problem of the package casing radiation effect caused by the prompt increasing of inner air temperature when the microwave oven is heating.

The calculating method of the temperature measured by the thermopile sensor 110a (as shown in FIG. 3) is as below.

$$T\_mea = T\_th + \Delta T\_tp + \Delta T\_cap$$

T_mea is the temperature measured by the thermopile sensor 110a. T_th is the temperature measured by the ambient temperature sensor 203. ΔT_tp is the external infrared radiation measured by the thermopile sensing element 202a. ΔT_cap is the infrared radiation caused by the metal package casing 205 and it is measured by the thermopile sensor 202a.

In the thermopile sensor 110b with dual thermopile sensing elements 202a, 202b (as shown in FIG. 4), the calculating method is as below.

$$T\_mea = T\_th + \Delta T$$

Where $\Delta T = Tp\_active - k * TP\_dummy$

The temperature difference ΔT is calculated by deducting the output of the active thermopile sensing element 202a with a constant k multiplying the output of the dummy thermopile sensing element 202b. The temperature T_mea of the object to be detected, which is modified with the package casing effect, is the temperature difference ΔT plus the temperature T_th measured by the ambient temperature sensor 203.

In some embodiments, the dummy thermopile sensing element 202b is fixed on the outer edge of the metal base 201. Under the restriction of the metal sleeve 111 (as shown in FIG. 2), the dummy thermopile sensing element 202b may only receive the infrared radiation from the metal package casing 205. The active thermopile sensing element 202a receives the infrared radiation including the infrared radiation from the external object to be detected and the infrared radiation from the metal package casing 205.

Therefore, in order to solve the problem of thermal shock caused by the air temperature disturbance in the microwave oven, the disclosure provides the temperature sensing device 100 having the thermopile sensing assembly 101. The active thermopile sensing element 202a is used to sense the temperature data of the object to be heated (for example, food) in the microwave oven. The dummy thermopile sensing element 202b is used to sense the thermal radiation of package casing in the metal package casing 205. The thermal radiation of package casing is caused by the air temperature disturbance in the microwave oven, for example, the prompt increasing of the air temperature in the microwave oven. The signal processing chip 204 compensates the thermal shock effect through the two temperature data from dual thermopile sensing elements for accurate temperature measurement of the heated object.

Figure 5:
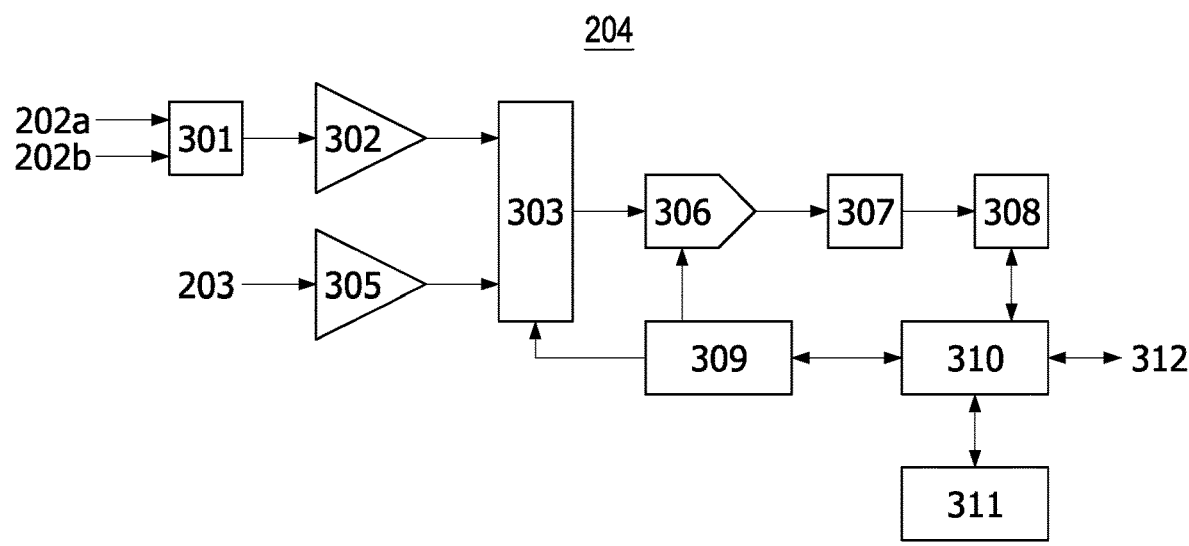
FIG. 5 is a block diagram of the signal processing chip of the thermopile sensor of the disclosure.

FIG. 5 is a block diagram of the signal processing chip 204 of the thermopile sensor of the disclosure. The signal processing chip 204 of the temperature sensing device in the disclosure receives the inputs from the thermopile sensing element 202a, 202b and the input from the ambient temperature sensor 203. In some embodiments, the signal processing chip 204 includes a low-noise amplifier 302, a first multiplexer 301, a second multiplexer 302, an ADC 306, a non-volatile memory 311, and a communication interface 310. Further, the ADC 306 may be a sigma-delta ADC.

In some embodiments, the thermopile signals from the active thermopile sensing element 202a and the dummy thermopile sensing element 202b are inputted to the low-noise amplifier 302 through the first multiplexer 301, and are fed to the ADC 306 after being selected by the second multiplexer 303, here is not intended to be limiting.

In some embodiments, the signal processing chip 204 further receives the input from the ambient temperature sensor 203. The ambient temperature signal is buffered by the buffer amplifier 305, and is fed to the ADC 306 after being selected by the second multiplexer 302, here is not intended to be limiting.

In some embodiments, the digital signal transformed by the ADC 306 is filtered though the filter 307, and is stored in the register 308, here is not intended to be limiting.

In some embodiments, the communication interface 310 is used to read out from or write into the register 308, and controls the operation of the signal processing chip 204. For example, selection of the sensor signal, activation of the ADC 306, and read-out/storage for the calibration parameter with respect to the non-volatile memory 311.

In some embodiments, the communication interface 310 may include I²C interface, here is not intended to be limiting.

In some embodiments, the signal processing chip 204 may include a state machine 309 (for example, microcontroller). The state machine 309 is triggered by the communication interface 310 to select the sensor channel to trigger the operation of the ADC 306 and store the digital signal transformed by the ADC 306 to the register 308 or the non-volatile memory 311, here is not intended to be limiting.

In some embodiments, the communication interface 310 may communicate with the external microcontroller (not shown in figures) through the interface signal 312.

Referring back to FIG. 3 or FIG. 4, in some embodiments, the infrared lens 207 may be a spherical lens or a silicon Fresnel lens, and may have an anti-reflective coating layer to increase infrared transmittance of object's radiation inputted to the thermopile sensor element 202a, here is not intended to be limiting.

Figure 6:
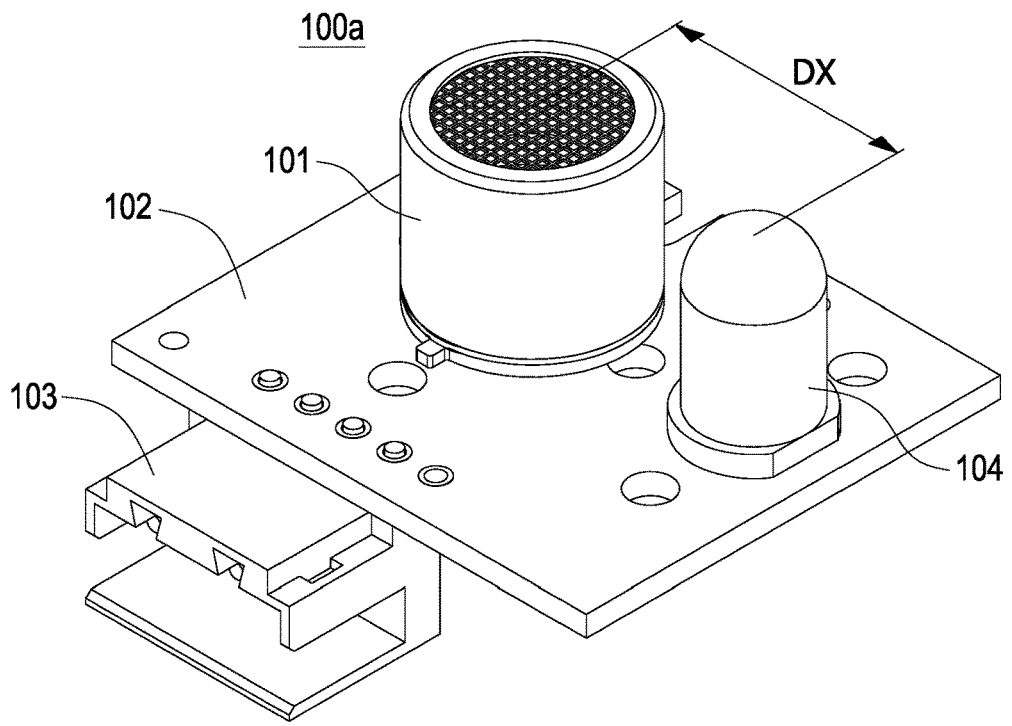
FIG. 6 is an exploded diagram of the temperature sensing device having a visible light source in the first embodiment of the disclosure.

FIG. 6 is an exploded diagram of the temperature sensing device 100a having a visible light source 104 in the first embodiment of the disclosure. The visible light source 104 of the temperature sensing device 100a may let the user position the object to be heated in the FOV of the thermopile sensing assembly 101. The thermopile sensing assembly 101 has a design of narrow FOV, such as 5-15 degrees. It is worth mentioning that the thermopile sensing assembly 101 may have the thermopile sensor 110a (single thermopile sensing element) as shown in FIG. 3 or the thermopile sensor 110b (dual thermopile sensing elements) as shown in FIG. 4, here is not intended to be limiting. The visible light source 104 may be a light emitting diode (LED), and the FOV is the same with that of the thermopile sensing assembly 101. After DX shifting, the illumination area of the visible light source 104 is the sensing area of the thermopile sensing assembly 101. Practically, DX is less than or equal to 1 cm.

Figure 7:
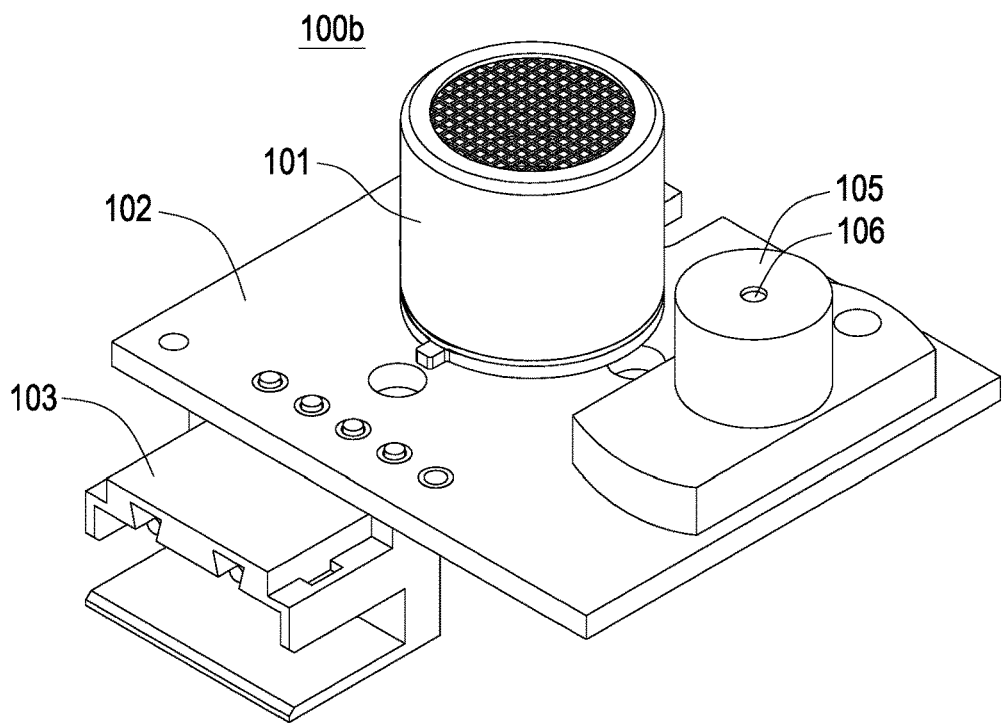
FIG. 7 is an exploded diagram of the temperature sensing device having a visible laser light source in the second embodiment of the disclosure.

FIG. 7 is an exploded diagram of the temperature sensing device 100b having a visible light source 105 in the second embodiment of the disclosure. The visible light source 105 may be a visible laser light module, which has a laser diode. In some embodiments, the visible light source 105 may be equipped with a beam expander 106 for adjusting the expanding angle of the laser source to be the same with the FOV of the thermopile sensing assembly 101. It is worth mentioning that the thermopile sensing assembly 101 may have the thermopile sensor 110a (single thermopile sensing element) as shown in FIG. 3 or the thermopile sensor 110b (dual thermopile sensing elements) as shown in FIG. 4, here is not intended to be limiting.

In summary, the temperature sensing device of the disclosure may prevent the disturbance caused by microwave radiation, and simultaneously measure the temperature of the object to be heated during heating. Further, in order to solve the problem of thermal shock caused disturbance by the hot air temperature in the microwave oven, the disclosure provides the temperature sensing device having dual thermopile sensing elements. The active thermopile sensing element is used to sense the temperature data of the object to be heated (for example, food) in the microwave oven. The dummy thermopile sensing element is used to sense the thermal radiation of the package casing in the metal package. The thermal radiation of the package casing is caused by the air temperature disturbance in the microwave oven, for example, the prompt increasing of the air temperature in the microwave oven. The signal processing chip is used to compensate the thermal shock effect through the temperature data of two thermopile sensing elements, one as active unit to sense external radiation from object and another one as dummy unit to sense the thermal radiation of packaging case due to thermal shock effect.

It is worth mentioning that, in some embodiments, in order to position heated object within sensing area of thermopile sensor, the thermopile sensor needs to have narrow FOV (for example, 5-15 degrees) for precisely detecting the surface temperature of the food to be detected instead of the sum of the temperature of the object to be detected and the background temperature. Therefore, the disclosure also provides the visible light source to indicate the sensing area of the thermopile sensor. The visible light source may be a LED or a visible light laser, and the illumination angle is the same with the FOV of the thermopile sensing assembly 101.

Therefore, comparing to the related art, the disclosure compensate the thermal shock effect caused by the air temperature disturbance in the microwave oven to provide accurate temperature measurement. Moreover, the disclosure adopts the optical design of narrow FOV for precisely measuring the surface temperature of the object without the influence from the background ambient temperature. The visualization design in the disclosure may let the user easily know the position where the thermopile sensor is detecting for the food to be heated.

While this disclosure has been described by means of specific embodiments, numerous modifications and variations may be made thereto by those skilled in the art without departing from the scope and spirit of this disclosure set forth in the claims.

What is claimed is:

1. A temperature sensing device, comprising:
   a substrate;
   a thermopile sensing assembly, disposed on the substrate, comprising a metal sleeve, a metal grid, and a thermopile sensor, the metal grid disposed on a window of the metal sleeve, and the thermopile sensor disposed in the metal sleeve; and
   a signal connector terminal, disposed on the substrate, wherein the thermopile sensor comprises:
      a metal base;
      a metal package casing, covering the metal base;
      one or more than one thermopile sensing elements, disposed on the metal base, and covered by the metal package casing;
      an ambient temperature sensor, disposed on the metal base;
      an infrared lens, disposed on a window of the metal package casing to provide an infrared radiation to the thermopile element; and
      a signal processing chip, disposed on the metal base.

2. The temperature sensing device according to claim 1, wherein the infrared lens is a spherical lens or a silicon Fresnel lens.

3. The temperature sensing device according to claim 1, wherein a field of view of the infrared lens is greater than or equal to 5 degrees and less than or equal to 15 degrees.

4. The temperature sensing device according to claim 1, wherein the infrared lens comprises an anti-reflective coating layer to increase a transmittance of the infrared radiation.

5. The temperature sensing device according to claim 1, wherein the thermopile sensor comprises two thermopile sensing elements, one of the thermopile sensing elements is an active thermopile sensing element for sensing the infrared radiation of an external object, and another one of the thermopile sensing elements is a dummy thermopile sensing element for sensing an infrared radiation of the metal package casing.

6. The temperature sensing device according to claim 1, wherein the signal processing chip comprises a low-noise amplifier, a multiplexer, an analog-to-digital converter (ADC), a non-volatile memory, and a communication interface.

7. The temperature sensing device according to claim 6, wherein the analog-to-digital converter is a sigma-delta ADC.

8. A temperature sensing device, comprising:
   a substrate;
   a thermopile sensing assembly, disposed on the substrate, comprising a metal sleeve, a metal grid, and a thermopile sensor, the metal grid disposed on a window of the metal sleeve, and the thermopile sensor disposed in the metal sleeve;
   a visible light source, disposed on the substrate; and
   a signal connector terminal, disposed on the substrate, wherein the thermopile sensor comprises:
      a metal base;
      a metal package casing, covering the metal base;
      one or more than one thermopile sensing elements, disposed on the metal base, and covered by the metal package casing;
      an ambient temperature sensor, disposed on the metal base;
      an infrared lens, disposed on a window of the metal package casing to provide an infrared radiation to the thermopile element; and
      a signal processing chip, disposed on the metal base.

9. The temperature sensing device according to claim 8, wherein the visible light source is a light emitting diode or a laser diode.

10. The temperature sensing device according to claim 8, wherein a field of view of the visible light source is same with a field of view of the thermopile sensor.

11. The temperature sensing device according to claim 9, wherein the laser diode comprises a beam expander.

* * * * *